United States Patent
Jaffari

(10) Patent No.: US 8,445,782 B2
(45) Date of Patent: May 21, 2013

(54) FLEXIBLE CONDUIT COUPLING CONNECTOR

(75) Inventor: Andy Ali Jaffari, Bartlett, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 304 days.

(21) Appl. No.: 12/872,017

(22) Filed: Aug. 31, 2010

(65) Prior Publication Data

US 2011/0073366 A1   Mar. 31, 2011

Related U.S. Application Data

(60) Provisional application No. 61/246,617, filed on Sep. 29, 2009.

(51) Int. Cl.
*H02G 3/06* (2006.01)

(52) U.S. Cl.
USPC .......................................................... 174/84 R

(58) Field of Classification Search
USPC ................. 174/84 R, 86, 88 R, 21 R
See application file for complete search history.

(56) References Cited

U.S. PATENT DOCUMENTS

| | | |
|---|---|---|
| 1,347,834 A | 7/1920 | Barber |
| 2,726,682 A | 12/1955 | Conroy et al. |
| 2,885,461 A | 5/1959 | Cafiero |
| 3,394,952 A | 7/1968 | Garrett |
| 3,479,066 A | 11/1969 | Gittleman |
| 3,565,468 A | 2/1971 | Garrett |
| 3,669,470 A | 6/1972 | Deurloo |
| 3,783,431 A | 1/1974 | Badey et al. |
| 4,036,513 A | 7/1977 | Loftus et al. |
| 4,101,151 A | 7/1978 | Ferguson |
| 4,109,097 A | 8/1978 | Berry |
| 4,172,607 A | 10/1979 | Norton |
| 4,221,407 A | 9/1980 | Steimle |
| 4,380,348 A | 4/1983 | Swartz |
| 4,426,106 A | 1/1984 | McCoy |
| 4,468,057 A | 8/1984 | De Crombrugghe |
| 4,480,860 A | 11/1984 | Foresta et al. |
| 4,538,839 A | 9/1985 | Ledgerwood |
| 4,726,611 A | 2/1988 | Sauer |
| 4,763,695 A | 8/1988 | Dooley |
| 5,215,338 A | 6/1993 | Kimura et al. |
| 5,288,110 A | 2/1994 | Allread |

(Continued)

OTHER PUBLICATIONS

Cooper Crousse-Hinds, XD Expansion /Deflection Coupling, Catalog p. 174, © 2002 Cooper Industries, Inc.

(Continued)

*Primary Examiner* — Chau Nguyen
(74) *Attorney, Agent, or Firm* — Snyder, Clark, Lesch & Chung, LLP

(57) ABSTRACT

A connector is provided for coupling a first conduit to a second conduit. The connector includes a first hub configured to connect to the first conduit and a second hub configured to connect to the second conduit. A flexible body is configured to sealingly connect to the first hub and the second hub. At least one clamp is provided for securing the flexible body to the first hub or the second hub. The flexible body includes an end having an annular groove therein to form an inner portion of the end and an outer portion of the end, wherein the annular groove is configured to eliminate radial deflection of the inner portion of the end when flexible body undergoes pressure from the at least one clamp.

20 Claims, 4 Drawing Sheets

U.S. PATENT DOCUMENTS

| | | |
|---|---|---|
| 5,506,376 A | 4/1996 | Godel |
| 5,778,939 A | 7/1998 | Hok-Yin |
| 5,992,896 A | 11/1999 | Davey et al. |
| 6,105,170 A | 8/2000 | Lisciandro et al. |
| 6,511,290 B1 * | 1/2003 | Gatley, Jr. .................. 415/212.1 |
| 6,734,360 B2 | 5/2004 | Magno |
| 6,874,822 B2 | 4/2005 | Yasuda et al. |
| 7,644,957 B2 | 1/2010 | Magno |

OTHER PUBLICATIONS

EGSs Appleton, Reflection and Expansion Coupling for Rigid Metal Conduit and IMC, p. 3, © 2001.

O-Z/Gedney, Expansion & Pull Box Fittings, CA4.

* cited by examiner

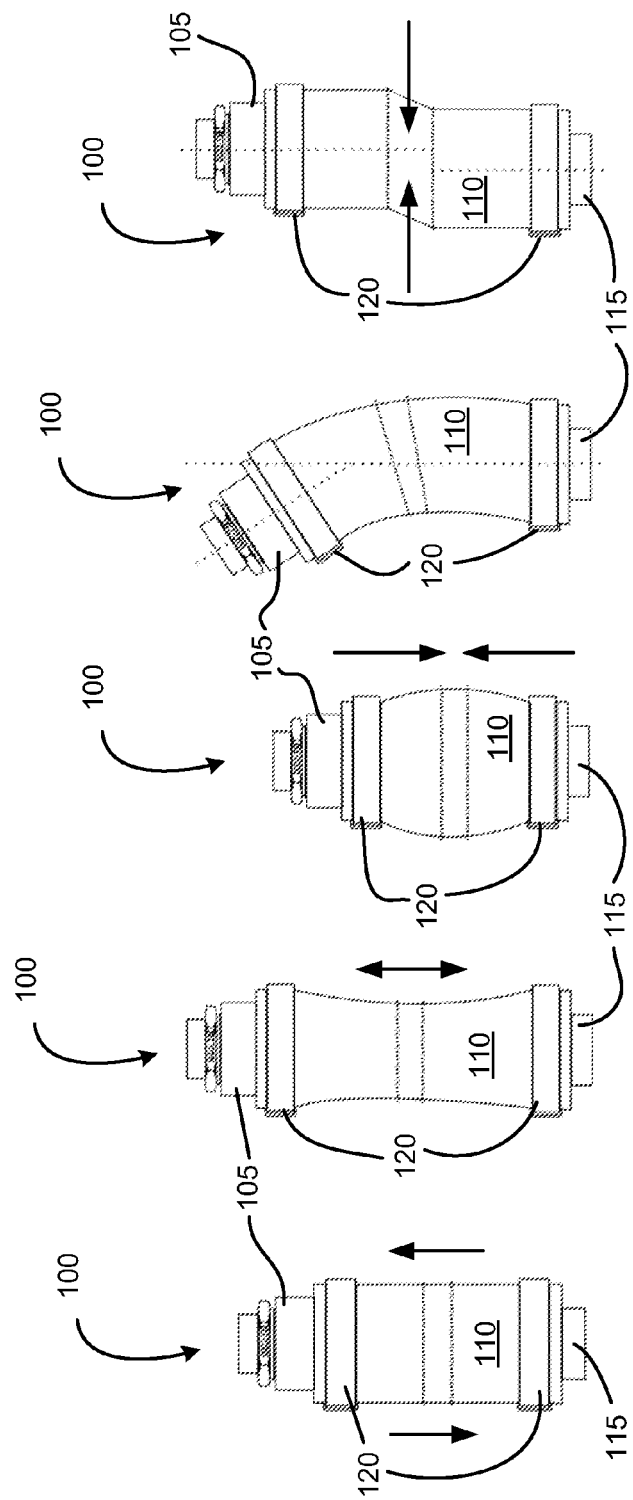

FLEXIBLE CONDUIT COUPLING CONNECTOR

CROSS-REFERENCE TO RELATED APPLICATION

This application claims priority under 35. U.S.C. §119, based on U.S. Provisional Patent Application No. 61/246,617 filed Sep. 29, 2009, the disclosure of which is hereby incorporated by reference herein.

BACKGROUND OF THE INVENTION

Electrical conduit is typically used to facilitate running electrical wires or cables within a structure or facility and to prevent damage to the wires or cables running through the conduit. Typical cable conduits include metal or non-metallic (e.g., plastic, elastomeric) tubes that receive the cable therein. The conduits may be positioned into a facility or structure prior to the cabling/wiring being installed. Often, pull strings are run through the conduits to facilitate subsequent insertion of cabling through the conduits. During cable installation, the cable is run through the conduit by affixing an end of the pull string to the cable (or cables) being run and pulling the string through the conduit.

In some environments, more than one length of conduit may be connected or coupled to each other. In these instances, a conduit coupling connector may be used to join the lengths of conduit together. For example, a typical conduit coupling connector may include an intermediate section joined by two threaded ends. The threaded ends may connect to each length of conduit being joined, and the intermediate section may include an angled configuration. The end result is a joined conduit with an angled coupling joining two straight lengths of conduit.

BRIEF DESCRIPTION OF THE DRAWINGS

FIGS. 3A-3E are top views of the exemplary conduit coupling connector of FIG. 1, illustrating a number of enabled orientations;

DETAILED DESCRIPTION OF THE PREFERRED EMBODIMENTS

The following detailed description refers to the accompanying drawings. The same reference numbers in different drawings may identify the same or similar elements.

Consistent with implementations described herein, an improved conduit coupling connector may be provided. Conduit couplings disclosed herein may be used to connect or otherwise join various types of conveying structures, such as conduits for enclosing electrical cables, communications cables, pipes for conveying various types of fluids, etc. Notwithstanding such uses, the device of the present invention is commonly referred to as a "conduit coupling" even though structures other than conduits may be included. Accordingly, as the term is used herein for simplicity, the term "conduit" should be interpreted as including any type of conveying structures that facilitates the conveyance and protection of items or fluids traveling therethrough.

Figure 1:
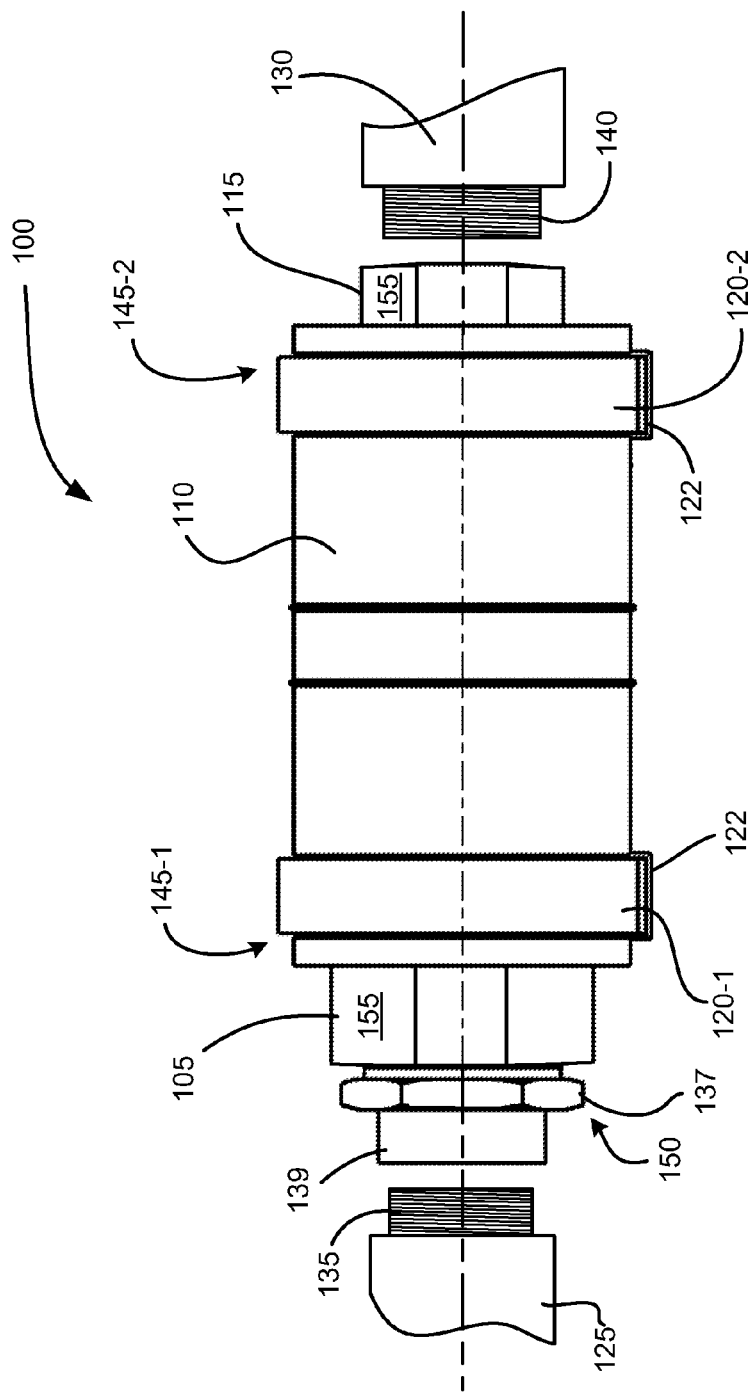
FIG. 1 is a top view of an exemplary conduit coupling connector consistent with implementations described herein.
Figure 2:
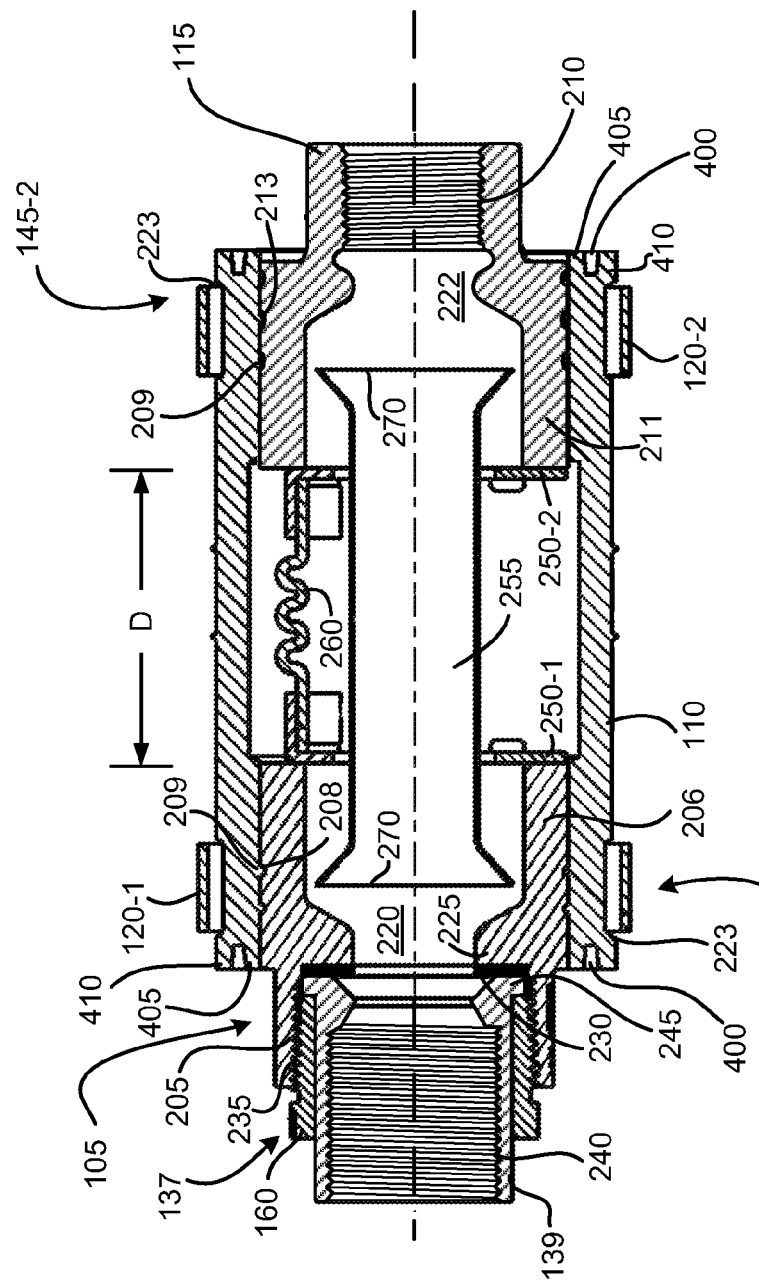
FIG. 2 is a cross-sectional view of the conduit coupling connector of FIG. 1.

FIG. 1 is a top view of an exemplary conduit coupling connector 100 consistent with implementations described herein. FIG. 2 is a cross-sectional view of the conduit coupling connector of FIG. 1. As shown in FIG. 1, conduit coupling connector may include first hub 105, a flexible body 110, a second hub 115, and clamps 120-1 and 120-2. In one implementation, first hub 105 and second hub 115 may be configured to include coupling interfaces or fittings for attachment to first and second conduits 125 and 130, respectively. For example, first hub 105 and second hub 115 may include internal threaded portions 205 and 210 (FIG. 2) for receiving external threaded portions 135 and 140 of first and second conduits 125 and 130, respectively.

As shown in FIG. 2, first hub 105 may include a substantially cylindrical body portion 206 formed adjacent to internal threaded portion 205. Body portion 206 and interior threaded portion may together include a substantially cylindrical cavity 220 extending therethrough. Cavity 220 may be configured to receive the items conveyed by first conduit 125 or second conduit 130, such as cables, wires, fluid, etc. In one implementation, an outer surface of body portion 206 may include a number of annular grooves 208 formed therein. As will be described in detail below, annular grooves 208 may receive corresponding annular ribs 209 formed on an inner surface of flexible body 110. Placement of annular ribs 209 within annular grooves 208 may ensure proper positioning of flexible body 110 relative to first hub 105, upon assembly of conduit coupling connector 100. In addition, annular ribs 209/annular grooves 208 may also provide a sealing relationship between flexible body 110 and first hub 104.

As shown in FIG. 2, second hub 110 may be similarly configured to include substantially cylindrical body portion 211, cavity 222, and annular grooves 213. At least some of annular ribs 209 formed on the inner surface of flexible body 110 may be received in annular grooves 213 for facilitating the proper positioning of and sealing of flexible body 110 relative to second hub 115, upon assembly of conduit coupling connector 100.

As shown in FIG. 1, first hub 105 and second hub 115 may further include annularly projecting tool engagement portions 155 that project from exposed ends of first hub 105 and second hub 115. For example, in one implementation, tool engagement portions 155 may include a hexagonal configuration for engaging a wrench or other suitable tool. In other implementations, tool engagement portions 155 may include a knurled or other high-friction surface (e.g., rippled, dimpled, grooved, etc.). By providing tool engagement portions 155 on first hub 105 and second hub 115, an installer may ensure that conduits 125 and 130 are securely tightened to flexible body 110, thereby providing a sealed configuration.

In one implementation consistent with embodiments described herein, first hub 105 and second hub 115 may be formed of a high strength metal, such as cast iron, steel, or stainless steel. In one exemplary embodiment, first hub 105 and second hub 115 are formed of ductile cast iron and may be plated with corrosion resistant zinc and painted with aluminum acrylic paint.

In some implementations, first hub 105 and/or second hub 115 may include a modular conduit union assembly 150 configured to facilitate rapid connection of conduit 125/130 to conduit coupling connector 100. For example, first hub 105 may include an Erickson-type coupling union assembly 150 that includes a union nut 137 and a coupling union 139. As described above, first hub 105 may include cavity 220 extending axially therethrough. An annular shoulder portion 225 may be formed in cavity 220 adjacent to internal threaded portion 205. An annular gasket 230 may be positioned within cavity 220 on shoulder portion 225. Annular gasket 230 may be formed of a resilient material, such as rubber, nylon, Teflon, or the like.

Union nut 137 may include an exterior threaded portion 235 for engaging internal threaded portion 205 of first hub 105. Union nut 137 may be an inside diameter substantially similar, yet slightly larger than, an outside diameter of a body of coupling union 139. As shown in FIGS. 1 and 2, union nut 137 may include an annularly projecting tool engagement portion 160 that projects from one end of union nut 137. For example, in one implementation, tool engagement portion 160 of union nut 137 may include a hexagonal configuration for engagement with a wrench or other suitable tool. In other implementations, tool engagement portion 160 may include a knurled or high-friction surface.

Coupling union 139 may be received between union nut 137 and first hub 105 and may include an internal threaded portion 240 for engaging external threaded portion 135 of first conduit 125. Coupling union 139 may further include an annular flange portion 245 extending radially from an end of coupling union 139. Annular flange portion 245 of coupling union 139 may have an outside diameter substantially similar to, yet slightly smaller than, an inside diameter of internal threaded portion 205 of first hub 105.

During installation of conduit coupling connector 100 to conduits 125 and 130, second hub 115 of coupling connector 100 may be threaded onto exterior threaded portion 140 of conduit 130, e.g., by rotation coupling connector 100 about an axial orientation of conduit 130. Coupling union 139 may be inserted into union nut 137. Internal threaded portion 240 of coupling union 139 may then be threaded onto external threaded portion 135 of first conduit 125, effectively trapping union nut 137 between first hub 105 and first conduit 125.

Coupling union 139 may be inserted into cavity 220, with an end of coupling union 139 abutting gasket 230. Exterior threaded portion 235 of union nut 137 may be threaded into internal threaded portion 205 of first hub 105. Because annular flange portion 245 of coupling union is trapped between union nut 137 and annular shoulder portion 225 of first hub 105, movement of union nut 137 into threaded portion 205 of first hub 105 effectively pulls coupling union 139 into a tight and sealed relationship with first hub 105.

Conduit coupling connector 100 may include a pair of ground mounting plates 250-1 and 250-2 (collectively, "ground mounting plates" 250, and individually "ground mounting plate 250), inner sleeve 255, and grounding cable 260. As shown in FIG. 2, inner sleeve 255 may be positioned within conduit coupling connector 100 to extend between cavity 220 in first hub 105 and cavity 222 in second hub 115. Inner sleeve 255 may be loose within conduit coupling connector 100 and may not be fixed to first hub 105 or second hub 155. In one implementation, inner sleeve 255 may be formed of a corrosion resistant material, such as stainless steel. In some implementations, inner sleeve 255 may include flared outer ends 270. Flaring outer ends 270 may prevent removal of inner sleeve 255 from ground mounting plates 250 and may also facilitate insertion or passage of cables or other materials through conduit coupling connector 100.

Ground mounting plates 250 may be configured for mounting to interior surfaces of first hub 105 and second hub 115, e.g., via screws or other fastening devices. In some implementations, ground mounting plates 250 may be formed of two or more elements to facilitate mounting of ground mounting plates 250 about inner sleeve 255. Because ground mounting plates 250 are not fixed to inner sleeve 255, inner sleeve 255 may move axially with respect to ground mounting plates 250 within the range enabled by flared outer ends 270. In one implementation, following installation, ground mounting plates 250 may be electrically or conductively connected to first conduit 125 and second conduit 130 via first hub 105 and second hub 115, respectively. Moreover, grounding cable 260 may be attached to ground mounting plates 250. For example, grounding cable 260 may be crimped or otherwise connected to ground mounting plates 250 to provide an electrical pathway across ground mounting plate 250-1 to 250-1 or vice versa. As illustrated, grounding cable 260 may include a number of expandable strands that may accommodate axial and angular movement of hub 105 relative to hub 115 without loss of ground contact. In one implementation, grounding cable 260 may be formed of copper or other suitable conductive material.

As illustrated in FIGS. 1 and 2, flexible body 110 may be positioned over first hub 105 and second hub 115. Clamps 120-1 and 120-2 (collectively, "clamps 120") may be substantially strap or band-like and may be placed around flexible body 110. For example, as shown in FIG. 2, flexible body 110 may include a pair of spaced apart clamp grooves 223. Clamp grooves 223 may include shallow annular grooves in an outer surface of flexible body 110 in a position overlying first hub 105 and second 115. During assembly, clamps 120 may be set into clamp grooves 223, thereby ensuring proper positioning of clamps 120 relative to first hub 105 and second hub 115. Clamps 120 may be tightened to fix flexible body 110 relative to first hub 105 and second hub 115. Furthermore, clamping flexible body 110 to first hub 105 and second hub 115 may maintain first hub 105 a first distance "D" from second hub 115 in a relaxed state.

Figure 4B:
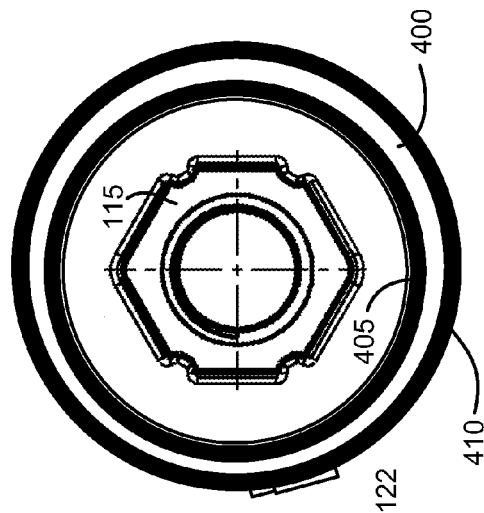
FIG. 4B is an end view illustrating one end of the conduit coupling connector of FIG. 1.
Figure 4A:
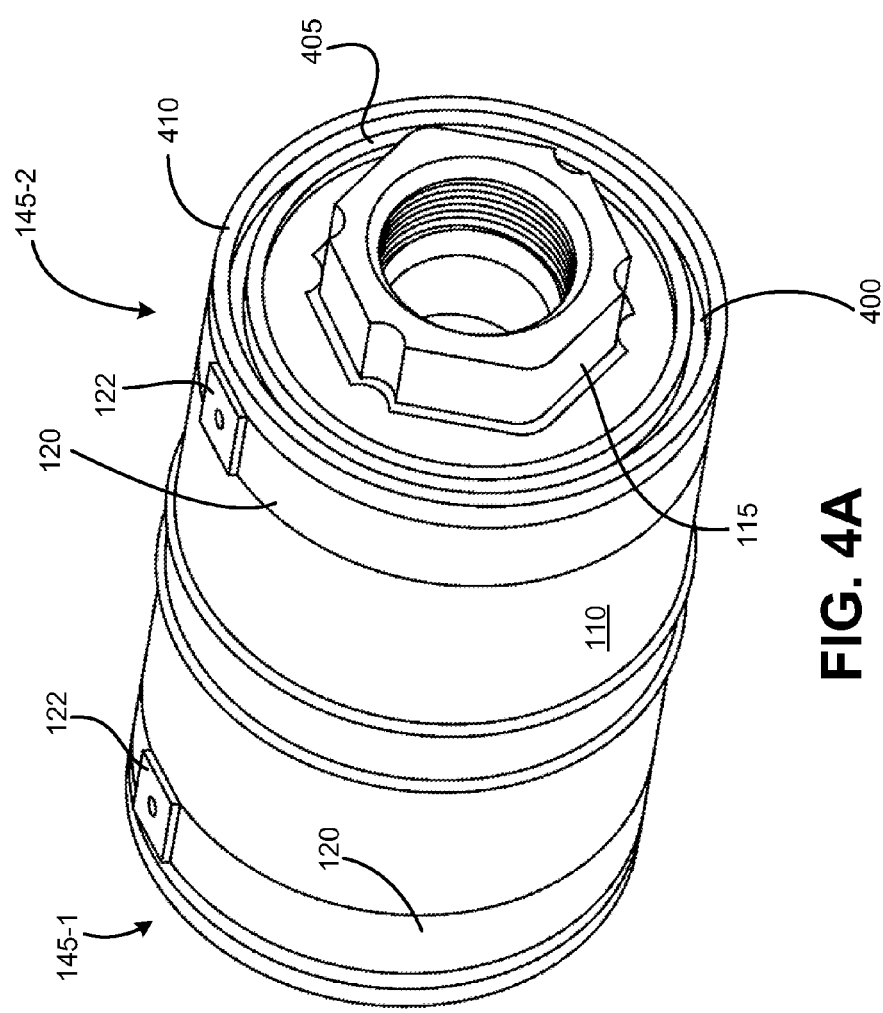
FIG. 4A is an enlarged isometric diagram of the conduit coupling connector of FIG. 1.

In one implementation, clamps 120 may be formed of stainless steel and may include tamperproof clamping mechanisms or buckles 122, as illustrated in FIG. 4A. Following tightening of clamps 120 about flexible body 110, clamping mechanisms 122 may protect conduit coupling connector 100 from being disassembled or the interior of conduit coupling connector 100 being otherwise disturbed.

Flexible body 110 may be formed of a resilient, flexible material, such as rubber, neoprene, or other elastomeric materials having a thickness of approximately 0.20 to 1.5 inches. In one implementation, flexible body 110 may include a substantially tubular configuration. Flexible body 110 may include ends 145-1 and 145-2 (collectively, "flexible body ends 145" and individually, "flexible body end 145"). Consistent with implementations described herein, flexible body ends 145-1 and 145-2 may be configured to sealingly engage external surfaces of first hub 105 and second hub 115, respectively upon application of radial pressure by clamps 120-1 and 120-2. Additional details regarding flexible body ends 145 are set forth below with respect to 4A-4B.

FIGS. 3A-3E are top views of conduit coupling connector 100 in various states. More specifically, FIG. 3A illustrates conduit coupling connector 100 in a relaxed state. That is, in the embodiment of FIG. 3A, flexible body 110 is neither extended, nor compressed. As described above, because inner sleeve 255 is not fixed to first hub 105 or second hub 115, flexible body ends 145 of flexible body 110 may be axially moveable relative to each other. FIG. 3B illustrates conduit coupling connector 100 in an extended state. FIG. 3C illustrates conduit coupling connector 100 in a compressed state. Consistent with implementations described herein, flexible body 110 may be extended or compressed by approximately 0.75 inches from its relaxed state, resulting in a total degree of axial movement of approximately 1.5 inches.

The flexible nature of flexible body 110 also enables angular and parallel deflection of flexible body 110 about an axis of conduit coupling connector 100. FIG. 3D illustrates conduit coupling connector 100 in which first hub 105 is deflected from second hub 115 by approximately 30 degrees. Consistent with embodiments described herein, angular deflection of first hub 105 relative to second hub 115 may range from 0 degrees to 30 degrees. FIG. 3E illustrates conduit coupling connector 100 in which first hub 105 is deflected from second hub 110 by a distance of approximately 0.75 inches. Consistent with embodiments described herein, parallel deflection of first hub 105 relative to second hub 115 may range from 0 inches to approximately 0.75 inches.

FIG. 4A is an enlarged isometric diagram of the conduit coupling connector 100. FIG. 4B is an end view of conduit coupling connector 100. Consistent with implementations described herein, flexible body end 145-2 of conduit coupling connector 100 may include an annular groove 400 formed in an end surface thereof, resulting in flexible body end 145-2 including an inner portion 405 and an outer portion 410. For example, annular groove 400 may be approximately 0.10 to 0.5 inches wide and approximately 0.25 to 0.5 inches deep, inner portion 405 may be approximately 0.175 to 0.5 inches wide, and outer portion 410 may be approximately 0.175 to 0.5 wide. In one exemplary implementation, annular groove 400 may be formed in an intermediate portion of the end surface of flexible body end 145. That is, annular groove 400 may be formed approximately midway between an inner diameter of flexible body 110 and an outer diameter of flexible body 110, such that inner portion 405 is sized substantially similarly to outer portion 410. In other implementations, the width of inner portion 405 and may be thicker or thinner than the width of outer portion 410. Although not illustrated in 4A or 4B, it should be understood that flexible body end 145-1 may be similarly configured to include groove 400, as illustrated in FIG. 2

Annular groove 400 may be provided to minimize a likelihood that compression of clamps 120 about flexible body 110 will result in gapping or disruption of a seal between flexible body 110 and first hub 105 and/or second hub 115. Consistent with implementations described herein, compression of clamp 120 may cause radial deflection of outer portion 410 of flexible body end 145, but does not cause radial deflection of inner portion 405. Consequently, inner portion 405 of flexible body end 145 may maintain a sealing relationship with hub 105/115.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A connector for coupling a first conduit to a second conduit, comprising:
    a first hub configured to connect to the first conduit;
    a second hub configured to connect to the second conduit;
    a flexible body having an inner surface configured to sealingly connect to the first hub and the second hub; and
    at least one clamp for securing the flexible body to the first hub or the second hub,
    wherein the flexible body includes at least one end having an annular groove therein to form an inner portion of the at least one end and an outer portion of the at least one end,
    wherein the at least one clamp is configured to engage the flexible body at a location longitudinally inside of the annular groove,
    wherein the annular groove is configured to eliminate radial deflection of the inner portion of the end when flexible body undergoes pressure from the at least one clamp.

2. The connector of claim 1,
    wherein the at least one end of the flexible body comprises a first end and a second end,
    wherein the first hub and the second hub are configured for insertion into the first end and the second end of the flexible body, respectively,
    wherein the at least one clamp comprises a first clamp and a second clamp, and
    wherein the first clamp is configured to fix first end to the first hub and the second clamp is configured to fix second end to the second hub.

3. The connector of claim 2, wherein the annular groove in the at least one end comprises a first annular groove in the first end and a second annular groove in the second end.

4. The connector of claim 1, wherein the flexible body comprises neoprene or rubber.

5. The connector of claim 1, wherein the clamp comprises a tamperproof strap.

6. The connector of claim 1, wherein the annular groove has a width of approximately 0.10 to 0.5 inches and a depth of approximately 0.25 to 0.5 inches.

7. The connector of claim 1, wherein dimensions of the inner portion of the end are substantially similar to dimensions of the outer portion of the end.

8. The connector of claim 1, further comprising:
    a first ground connecting plate connected to the first hub;
    a second ground connecting plate connected to the second hub;
    a flexible ground cable connecting the first ground connecting plate to the second ground connecting plate; and
    an inner sleeve extending between the first ground connecting plate and the second ground connecting plate,
    wherein the inner sleeve is axially moveable with respect to the first ground connecting plate and the second ground connecting plate.

9. The connector of claim 8, wherein the flexible body is configured to sealingly cover the first ground connecting plate, the second ground connecting plate, the flexible ground cable, and the inner sleeve.

10. The connector of claim 1, wherein the clamp comprises stainless steel.

11. The connector of claim 1, wherein the flexible body is configured to allow axial movement of the first hub with respect to the second hub, wherein the axial movement comprises approximately 1.5 inches.

12. The connector of claim 1, wherein the flexible body is configured to allow angular deflection of the first hub with respect to the second hub, wherein the angular deflection ranges from 0 degrees to approximately 30 degrees.

13. The connector of claim 1, wherein the flexible body is configured to allow parallel deflection of the first hub with respect to the second hub, wherein the parallel deflection ranges from 0 inches to approximately 0.75 inches.

14. A device, comprising:
   a substantially tubular resilient body having an inside surface and a first end longitudinally opposing a second end;
   a first fitting inserted into the first end and configured to engage the inside surface of the tubular resilient body;
   a second fitting inserted into the second end and configured to engage the inside surface of the tubular resilient body; and
   clamp means for clamping the resilient body to the first fitting and the second fitting,
   wherein each of the first end and the second end include an annular groove therein for reducing radial deflection of the first end from the first fitting and the second end from the second fitting when clamped by the clamp means, and
   wherein the clamp means is configured to engage the tubular resilient body at a location longitudinally inside of the annular groove.

15. The device of claim 14, wherein the resilient body comprises rubber or neoprene.

16. The device of claim 14, wherein the resilient body comprises an annular clamp groove in an outer surface thereof for receiving the clamp means.

17. The device of claim 14, wherein the annular grooves are formed in intermediate portions of the first end and the second end.

18. The device of claim 14, wherein the annular groove has a width of approximately 0.10 to 0.5 inches and a depth of approximately 0.25 to 0.5 inches.

19. A clamp assembly, comprising:
   flexible body means for receiving a fitting on an inner surface thereof,
   wherein the flexible body means include an end having an annular groove formed therein; and
   clamp means for securing the flexible body means to the fitting in an area proximate to the end by applying radial pressure to the flexible body about the fitting,
   wherein the clamp means is configured to engage the flexible body means at a location longitudinally inside of the annular groove, and
   wherein the annular groove is configured to reduce radial deflection of the end relative to the fitting.

20. The clamp assembly of claim 19, wherein the flexible body means comprises rubber or neoprene.

* * * * *